Patented May 2, 1933

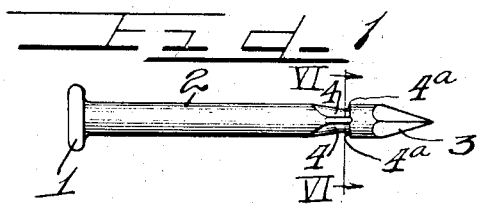
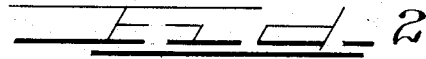
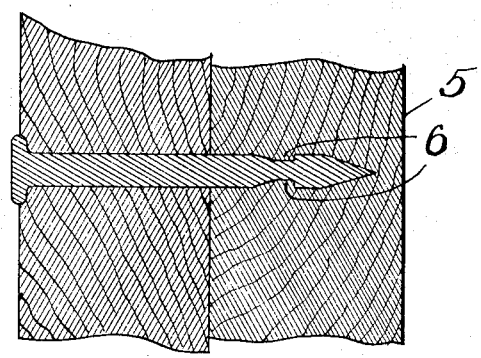
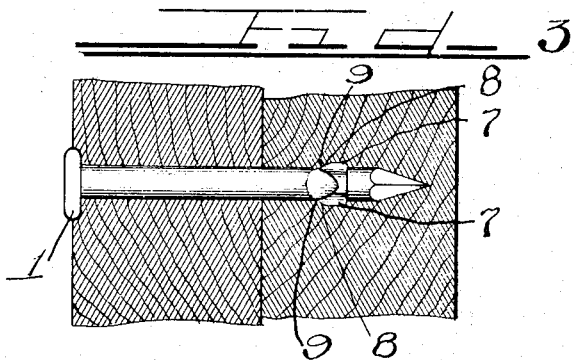
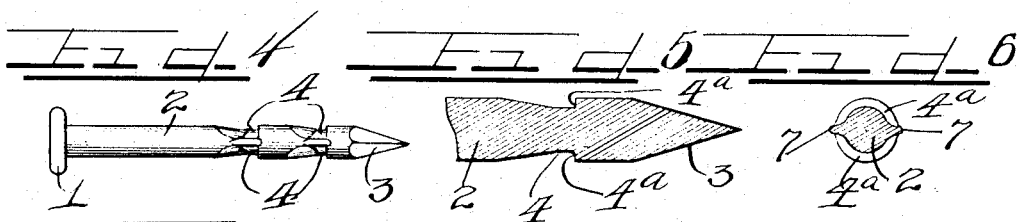
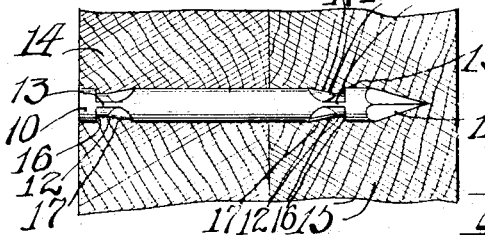

1,906,527

UNITED STATES PATENT OFFICE

ALBERT BRADLEY, OF STERLING, ILLINOIS, ASSIGNOR TO NORTHWESTERN BARB WIRE COMPANY, OF STERLING, ILLINOIS, A CORPORATION OF ILLINOIS

FASTENING ELEMENT

Application filed October 22, 1930. Serial No. 490,406.

This invention has to do with fastening elements such as nails, dowels, pins, and the like, and it is the principal object of the invention to provide a nail so constructed as to have the holding characteristics of a much larger nail of ordinary construction not embodying my invention.

A further object of the invention is to provide a nail adapted to interlock with the material in which it is embedded to thereby greatly increase resistance to removal of the nail.

In carrying out my invention, I provide the nail or the like adjacent its point or wedge with a substantially U-shaped or V-shaped depression, and when the nail is embedded in wood or the like, the latter, by reason of its inherent resilience fills the said depression so that, in order to remove the nail, it is necessary not only to overcome the friction between the wall of the nail and the surrounding wood or the like, but it is necessary further to force the latter out of said depression.

Other objects and advantages of the present invention will more fully appear from the following detailed description taken in connection with the accompanying drawing, which illustrates a single embodiment thereof and in which Figure 1 is an elevational view of a nail embodying the invention.

Figure 2 is a sectional view showing the improved nail embedded in wooden members.

Figure 3 is a view taken at right angles to that of Figure 2, the nail being shown in elevation.

Figure 4 shows in elevation a modified form of the invention.

Figure 5 is an enlarged fragmentary sectional view of that portion of the nail embodying the invention.

Figure 6 is an enlarged cross-sectional view taken in the plane VI—VI of Figure 1.

Figure 7 is a sectional view similar to Figure 3 showing another modified form of the invention.

On the drawing:

In the accompanying sheet of drawing, wherein the same element is indicated throughout by the same reference character, I illustrate in Figure 1, a nail embodying one form of my invention and comprising an impact end or head 1 having a shank 2 and a point 3, the shank having, adjacent its point 3, a substantially V-shaped notch 4. If desired, the notch 4 may take the form of an annular or spiral groove, but, in any event, the wall 4a of the notch 4 adjacent the point 3 is preferably disposed at right angles to the axis of the shank 2 or somewhat inclined toward the extremity of the point 3. It will be apparent that, when the nail is embedded in wood 5 or the like, as shown in Figure 2, a portion 6 of the wood or the like will be lodged in the notch 4 behind the above referred to wall of the notch, and it will, therefore, be appreciated that the combined resistance offered by the wood at the point 6 and elsewhere where it engages the nail, is equal to the resistance to such removal occasioned upon the use of a heavier nail having much greater surface area of contact with the wood or the like.

If desired, the nail may be provided with one or a plurality of notches 4, each functioning exactly the same as that above mentioned, to further increase resistance to removal of the nail.

From a manufacturer's standpoint, the nail embodying my invention is very practical and it has been found by experience that a 7-D common nail embodying this invention will hold equally as well as an 8-D common nail not employing my invention, and that there are 60 per cent. more nails of the former variety to the pound than of the latter. Thus the advantages derived in the use of my invention are clearly apparent.

The notches or depressions formed in the nail may be caused by cutting into the nail, although if desired, the same may be formed by merely depressing the shank and thereby upsetting the portion of the shank adjacent the depression, as indicated at 7. The walls 8 of the portions 7 are also engageable with portions 9 of the wood or the like to further resist removal of the nail, yet the parts 7 are so narrow, comparatively, that they do not materially obstruct entry of the nail.

It will be noted in connection with the improved form of nail devised by me that for all practical purposes there is no increase, but rather a decrease in the resistance offered by the material, into which the nail is embedded, to the progress of the nail therein, since the area of resistance is reduced by reason of the notches or depressions to a greater extent than it is increased by the upset portions 7. By locating the notches or depressions adjacent the point of the shank, it will be appreciated that in practice the shank will offer the same resistance to shear at the juncture of the pieces of material fastened by it, as is offered by an ordinary nail.

Another form of the invention may be embodied in a dowel pin construction as illustrated in Figure 7. It will be noted that the dowel pin 10 has an entering wedge or point 11 at one end and adjacent each end oppositely directed notches 12 are provided. Ridges or fins 13 may be included if desired. The pin 10 connects the pieces 14 and 15, and once the pin is embedded, as shown, the walls 16 of the notches 12 interlock with the material at 17, thereby preventing separation of each piece from the pin.

Now, of course, it is to be understood that although I have illustrated and described in detail the preferred form of my invention, the invention is not to be thus limited, but only insofar as defined by the scope and spirit of the appended claims.

I claim as my invention:

1. A dowel comprising a pin having an entering wedge at one end and a flat impact receiving portion at its other end, a shoulder adjacent each end and facing the opposite end, said portion and shoulders being disposed radially within the confines of the surface of the body of the pin, whereby said pin may be driven through a solid part of one piece of material and into a solid part of a second piece of material, said shoulders, when embedded in said pieces, engaging the material of said pieces and thereby preventing separation thereof.

2. A dowel comprising a pin having an entering wedge at one end and a flat impact receiving portion at its other end, a shoulder adjacent each end and facing the opposite end, said portion and shoulders being disposed radially within the confines of the surface of the body of the pin, whereby said pin may be driven through a solid part of one piece of material and into a solid part of a second piece of material, said shoulders, when embedded in said pieces, engaging the material of said pieces and thereby preventing separation thereof, and fins adjacent said shoulders and projecting slightly beyond said confines to cooperate with said shoulders in resisting separation of the pieces of material secured by the pin, said fins being narrow relative to the pin to minimize resistance to entry of the pin into the material.

3. A headless nail having an entering wedge at one end and a flat impact receiving portion at its other end, a shoulder adjacent each end and facing the opposite end and disposed at substantially a right angle to the axis of the nail, said shoulders being disposed within the confines of the surface of the nail, whereby said nail may be driven through a solid part of one piece of material and into a solid part of a second piece of material, said shoulders, when embedded in said pieces, engaging the material thereof and thereby preventing separation of said pieces.

In testimony whereof I have hereunto subscribed my name at Sterling, Whiteside County, Illinois.

ALBERT BRADLEY.